(12) United States Patent
Steele et al.

(10) Patent No.: US 9,080,849 B2
(45) Date of Patent: Jul. 14, 2015

(54) TAPE MEASURE

(75) Inventors: Michael S. Steele, Waukesha, WI (US);
Steven W. Hyma, Milwaukee, WI (US);
Wade F. Burch, Wauwatosa, WI (US);
Cheng Zhang Li, Colgate, WI (US);
Scott R. Fischer, Menomonee Falls, WI (US); Abhijeet A. Khangar, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 65 days.

(21) Appl. No.: 13/561,742

(22) Filed: Jul. 30, 2012

(65) Prior Publication Data

US 2013/0025147 A1 Jan. 31, 2013

Related U.S. Application Data

(60) Provisional application No. 61/513,280, filed on Jul. 29, 2011, provisional application No. 61/607,060, filed on Mar. 6, 2012, provisional application No. 61/656,297, filed on Jun. 6, 2012.

(51) Int. Cl.
*G01B 3/10* (2006.01)

(52) U.S. Cl.
CPC .................................... *G01B 3/1041* (2013.01)

(58) Field of Classification Search
CPC ................. G01B 2003/1015; G01B 2003/103; G01B 2003/1035; G01B 3/1005; G01B 3/10
USPC .................................................... 33/761, 769
See application file for complete search history.

(56) References Cited

U.S. PATENT DOCUMENTS

| 14,947 | A | | 5/1856 | Buck et al. | |
|---|---|---|---|---|---|
| 1,303,756 | A | | 5/1919 | Ballou | |
| 1,613,676 | A | | 1/1927 | Raphael | |
| 1,966,707 | A | * | 7/1934 | Buck | 33/769 |
| 1,992,947 | A | * | 3/1935 | Hayward | 33/769 |
| 2,052,259 | A | | 8/1936 | Stowell | |
| 2,156,905 | A | | 5/1939 | Stowell et al. | |

(Continued)

FOREIGN PATENT DOCUMENTS

| CN | 2174684 | 8/1994 |
|---|---|---|
| DE | 102006058396 A1 | 7/2008 |

(Continued)

OTHER PUBLICATIONS

Hyun-Kyu Ko, "A Study on Design of Measure Tape for Home Use (for DYI)" (1996) Master's Thesis-Kyung Sung University, Graduate School of Industry, Department of Industrial Design, 658.04 4 (81 pages with English translation).

*Primary Examiner* — Yaritza Guadalupe-McCall
(74) *Attorney, Agent, or Firm* — Michael Best & Friedrich LLP

(57) ABSTRACT

A tape measure includes a housing assembly having a first side wall, a second side wall, and a peripheral wall extending from the first side wall to the second side wall. A cavity is defined within the housing assembly, and the first side wall defines at least one aperture open to the cavity during use of the tape measure. The peripheral wall defines a tape port. A spool is rotatably supported in the cavity about an axis and includes at least a portion of a measuring tape. A hook member is fixedly coupled to an end portion of the measuring tape. The spool includes a retraction mechanism with an elongated coiled spring.

18 Claims, 2 Drawing Sheets

(56) References Cited

U.S. PATENT DOCUMENTS

| | | |
|---|---|---|
| 2,574,272 A | 11/1951 | McCully |
| 2,614,769 A | 10/1952 | Nicholson |
| 2,683,933 A | 7/1954 | McFarland |
| 2,816,369 A | 12/1957 | Becker |
| 2,994,958 A | 8/1961 | Beeber |
| 3,100,937 A | 8/1963 | Burch |
| 3,164,907 A | 1/1965 | Quenot |
| 3,214,836 A | 11/1965 | West |
| 3,499,225 A | 3/1970 | Darrah |
| 3,499,612 A | 3/1970 | Zelnick |
| 3,519,219 A | 7/1970 | Zelnick |
| 3,519,220 A | 7/1970 | Zelnick |
| 3,521,831 A | 7/1970 | Schmidt |
| 3,570,782 A | 3/1971 | Hayes |
| 3,577,641 A | 5/1971 | Smith |
| 3,578,259 A | 5/1971 | Zelnick |
| 3,672,597 A | 6/1972 | Williamson |
| 3,713,603 A | 1/1973 | Shore |
| 3,716,201 A | 2/1973 | West |
| 3,816,925 A | 6/1974 | Hogan et al. |
| 3,838,520 A | 10/1974 | Quenot |
| 3,869,096 A | 3/1975 | Hogan et al. |
| 3,874,608 A | 4/1975 | Quenot |
| 3,905,114 A | 9/1975 | Rutty |
| 3,908,277 A | 9/1975 | Rutty |
| 3,918,657 A | 11/1975 | Hawker et al. |
| 3,942,738 A | 3/1976 | Rutty |
| 4,067,513 A | 1/1978 | Rutty et al. |
| 4,077,128 A | 3/1978 | Stoutenberg |
| D247,878 S | 5/1978 | Covey |
| 4,103,426 A | 8/1978 | Robin |
| 4,121,785 A | 10/1978 | Quenot |
| 4,131,244 A | 12/1978 | Quenot |
| 4,142,693 A | 3/1979 | Czerwinski |
| 4,149,320 A | 4/1979 | Troyer et al. |
| 4,153,996 A | 5/1979 | Rutty |
| 4,161,781 A | 7/1979 | Hildebrandt et al. |
| 4,164,334 A | 8/1979 | Rathbun et al. |
| 4,164,816 A | 8/1979 | Bergkvist |
| D253,876 S | 1/1980 | Covey |
| D253,877 S | 1/1980 | Covey et al. |
| 4,186,490 A | 2/1980 | Quenot |
| 4,189,107 A * | 2/1980 | Quenot et al. .................. 33/761 |
| 4,200,983 A | 5/1980 | West et al. |
| 4,215,828 A | 8/1980 | Rathbun et al. |
| 4,215,829 A | 8/1980 | Boyllin |
| D256,894 S | 9/1980 | Bruno |
| D257,008 S | 9/1980 | Hildebrandt |
| 4,286,387 A | 9/1981 | Di Diego |
| 4,288,923 A | 9/1981 | Duda |
| 4,363,171 A * | 12/1982 | Scandella ........................ 33/769 |
| 4,411,072 A | 10/1983 | Rutty et al. |
| 4,427,883 A | 1/1984 | Betensky et al. |
| 4,429,462 A | 2/1984 | Rutty et al. |
| 4,433,486 A | 2/1984 | Muehlenbein |
| 4,434,952 A | 3/1984 | Czerwinski et al. |
| 4,449,302 A | 5/1984 | Drechsler et al. |
| 4,462,160 A | 7/1984 | Cohen |
| 4,476,635 A | 10/1984 | Hart |
| 4,479,617 A | 10/1984 | Edwards |
| 4,487,379 A | 12/1984 | Drechsler et al. |
| 4,489,494 A | 12/1984 | Duda |
| 4,516,325 A | 5/1985 | Cohen et al. |
| D279,553 S | 7/1985 | Drechsler |
| 4,527,334 A | 7/1985 | Jones et al. |
| 4,547,969 A | 10/1985 | Haack |
| 4,574,486 A | 3/1986 | Drechsler |
| 4,578,867 A | 4/1986 | Czerwinski et al. |
| 4,583,294 A | 4/1986 | Hutchins et al. |
| 4,603,481 A | 8/1986 | Cohen et al. |
| 4,619,020 A | 10/1986 | Lecher, Sr. |
| 4,748,746 A | 6/1988 | Jacoff |
| 4,811,489 A | 3/1989 | Walker |
| 4,813,625 A * | 3/1989 | Takeda ........................ 242/395 |
| 4,860,901 A | 8/1989 | Hochreuther et al. |
| 4,896,280 A | 1/1990 | Phillips |
| 4,930,227 A | 6/1990 | Ketchpel |
| 4,965,941 A | 10/1990 | Agostinacci |
| 4,972,601 A | 11/1990 | Bickford et al. |
| 4,982,910 A | 1/1991 | Bickford |
| 4,998,356 A | 3/1991 | Chapin |
| 5,010,657 A | 4/1991 | Knapp |
| 5,038,985 A | 8/1991 | Chapin |
| 5,046,339 A | 9/1991 | Krell |
| 5,062,215 A | 11/1991 | Schlitt |
| 5,134,784 A | 8/1992 | Atienza |
| D333,628 S | 3/1993 | Piotrkowski |
| 5,189,801 A | 3/1993 | Nicely |
| 5,208,767 A | 5/1993 | George-Kelso et al. |
| 5,210,956 A | 5/1993 | Knispel et al. |
| 5,230,158 A | 7/1993 | Wall |
| D342,210 S | 12/1993 | Grossman |
| D342,459 S | 12/1993 | Shen |
| D342,687 S | 12/1993 | Kang |
| 5,335,421 A | 8/1994 | Jones, Jr. |
| D350,703 S | 9/1994 | Fifer |
| 5,367,785 A | 11/1994 | Benarroch |
| 5,448,837 A | 9/1995 | Han-Teng |
| D365,769 S | 1/1996 | Kang |
| 5,481,813 A | 1/1996 | Templeton |
| 5,506,378 A | 4/1996 | Goldenberg |
| 5,531,395 A | 7/1996 | Hsu |
| 5,542,184 A | 8/1996 | Beard |
| D375,269 S | 11/1996 | Wertheim et al. |
| 5,575,077 A | 11/1996 | Jung Tae |
| 5,600,894 A | 2/1997 | Blackman et al. |
| 5,659,970 A | 8/1997 | Reedy |
| 5,699,623 A | 12/1997 | Lee |
| 5,746,004 A | 5/1998 | Wertheim |
| D396,816 S | 8/1998 | Kang |
| D397,304 S | 8/1998 | Kang |
| 5,791,581 A | 8/1998 | Loeffler et al. |
| 5,794,357 A | 8/1998 | Gilliam et al. |
| D397,626 S | 9/1998 | Davis |
| D397,950 S | 9/1998 | Blackman et al. |
| 5,806,202 A | 9/1998 | Blackman et al. |
| 5,815,940 A | 10/1998 | Valentine, Sr. |
| 5,820,057 A | 10/1998 | Decarolis et al. |
| 5,829,152 A | 11/1998 | Potter et al. |
| D402,216 S | 12/1998 | Gilliam et al. |
| 5,842,284 A | 12/1998 | Goldman |
| 5,875,557 A | 3/1999 | Ueki |
| 5,884,408 A | 3/1999 | Simmons |
| 5,894,677 A | 4/1999 | Hoffman |
| 5,895,539 A | 4/1999 | Hsu |
| D409,104 S | 5/1999 | Yang |
| 5,913,586 A | 6/1999 | Marshall |
| 5,922,999 A | 7/1999 | Yang |
| D412,858 S | 8/1999 | Staton |
| 5,990,435 A | 11/1999 | Chao |
| 6,011,472 A | 1/2000 | Pendergraph et al. |
| D420,606 S | 2/2000 | Hsu |
| D421,230 S | 2/2000 | Gilliam et al. |
| 6,026,585 A | 2/2000 | Li |
| 6,032,379 A | 3/2000 | Usami |
| D423,382 S | 4/2000 | Piotrkowski |
| 6,052,914 A | 4/2000 | Soon |
| D424,454 S | 5/2000 | Ikeda |
| 6,082,017 A | 7/2000 | Simar |
| 6,085,433 A | 7/2000 | Li |
| 6,098,303 A | 8/2000 | Vogel |
| 6,108,926 A | 8/2000 | Fraser et al. |
| 6,115,933 A | 9/2000 | Li |
| RE36,887 E | 10/2000 | Goldman |
| 6,148,534 A | 11/2000 | Li |
| 6,161,299 A | 12/2000 | Lin |
| 6,167,635 B1 | 1/2001 | Lin |
| 6,178,655 B1 | 1/2001 | Potter et al. |
| D438,478 S | 3/2001 | Lin |
| D439,531 S | 3/2001 | Davis et al. |
| 6,209,219 B1 | 4/2001 | Wakefield et al. |
| D441,308 S | 5/2001 | Davis |
| D442,076 S | 5/2001 | Swanson |
| 6,237,243 B1 | 5/2001 | Cook |

(56) References Cited

U.S. PATENT DOCUMENTS

| | | |
|---|---|---|
| RE37,212 E | 6/2001 | Marshall et al. |
| 6,243,964 B1 | 6/2001 | Murray |
| 6,249,986 B1 | 6/2001 | Murray |
| D447,069 S | 8/2001 | Budrow |
| 6,272,764 B1 | 8/2001 | Lin |
| 6,276,071 B1 | 8/2001 | Khachatoorian |
| D447,712 S | 9/2001 | Hsu |
| 6,282,808 B1 | 9/2001 | Murray |
| 6,308,432 B1 | 10/2001 | Gilliam et al. |
| D451,041 S | 11/2001 | Chen |
| 6,324,769 B1 | 12/2001 | Murray |
| 6,338,204 B1 | 1/2002 | Howle |
| D453,303 S | 2/2002 | Lin |
| 6,349,482 B1 | 2/2002 | Gilliam |
| 6,367,161 B1 | 4/2002 | Murray et al. |
| D458,163 S | 6/2002 | Kang |
| D458,550 S | 6/2002 | Hsu |
| 6,431,486 B1 | 8/2002 | Lee |
| D463,300 S | 9/2002 | Li |
| 6,442,863 B1 | 9/2002 | Poineau et al. |
| 6,449,866 B1 | 9/2002 | Murray |
| D464,277 S | 10/2002 | Traver, III |
| D464,579 S | 10/2002 | Martone |
| 6,470,582 B1 | 10/2002 | Renko |
| 6,470,590 B1 | 10/2002 | Lee |
| 6,490,809 B1 | 12/2002 | Li |
| 6,497,050 B1 | 12/2002 | Ricalde |
| 6,499,226 B1 | 12/2002 | Reda et al. |
| D469,704 S | 2/2003 | Williams et al. |
| RE38,032 E | 3/2003 | Butwin |
| D471,473 S | 3/2003 | Blackman et al. |
| D471,827 S | 3/2003 | Ranieri et al. |
| 6,530,159 B2 | 3/2003 | Traver, III |
| 6,543,144 B1 | 4/2003 | Morin |
| 6,546,644 B2 | 4/2003 | Poineau et al. |
| D474,412 S | 5/2003 | Ichinose et al. |
| 6,568,099 B2 | 5/2003 | Bergeron |
| D476,913 S | 7/2003 | Blackman et al. |
| 6,595,451 B1 | 7/2003 | Kang et al. |
| 6,598,310 B1 | 7/2003 | Odachowski |
| 6,637,124 B2 | 10/2003 | Pederson |
| 6,637,126 B2 | 10/2003 | Balota |
| 6,643,947 B2 | 11/2003 | Murray |
| D485,770 S | 1/2004 | Lee |
| D486,086 S | 2/2004 | Jueneman |
| 6,684,522 B2 | 2/2004 | Chilton |
| 6,688,010 B1 | 2/2004 | Schwaerzler |
| 6,691,426 B1 | 2/2004 | Lee et al. |
| 6,694,622 B2 | 2/2004 | Kim |
| 6,698,679 B1 | 3/2004 | Critelli et al. |
| 6,718,649 B1 | 4/2004 | Critelli et al. |
| 6,760,979 B1 | 7/2004 | Hsu |
| 6,796,052 B1 | 9/2004 | Lin |
| 6,804,899 B2 | 10/2004 | Murray |
| 6,811,109 B2 | 11/2004 | Blackman et al. |
| 6,836,975 B2 | 1/2005 | Lin |
| 6,839,981 B2 | 1/2005 | Rafter |
| 6,854,197 B2 | 2/2005 | Knight |
| D503,351 S | 3/2005 | Chen |
| D503,637 S | 4/2005 | Noel |
| D503,897 S | 4/2005 | Lin |
| 6,874,245 B2 | 4/2005 | Liu |
| D504,628 S | 5/2005 | Weeks et al. |
| D504,835 S | 5/2005 | Snider |
| D504,836 S | 5/2005 | Wang |
| 6,892,468 B2 | 5/2005 | Murray |
| 6,904,697 B2 | 6/2005 | Zars |
| D507,195 S | 7/2005 | Kondo et al. |
| 6,918,191 B2 | 7/2005 | Stauffer et al. |
| 6,920,700 B2 | 7/2005 | Ekdahl et al. |
| 6,931,734 B2 | 8/2005 | Elder et al. |
| 6,931,753 B2 | 8/2005 | Ryals et al. |
| 6,935,045 B2 | 8/2005 | Cubbedge |
| 6,938,354 B2 | 9/2005 | Worthington |
| 6,944,961 B2 | 9/2005 | Carroll |
| 6,959,499 B2 | 11/2005 | Bini |
| 6,962,002 B2 | 11/2005 | Panosian |
| D514,962 S | 2/2006 | Armendariz |
| 6,996,915 B2 | 2/2006 | Ricalde |
| 7,024,791 B2 | 4/2006 | Marshall et al. |
| D522,890 S | 6/2006 | Huang |
| 7,055,260 B1 | 6/2006 | Hoffman |
| 7,057,484 B2 | 6/2006 | Gilmore |
| 7,059,061 B2 | 6/2006 | French |
| 7,131,214 B1 | 11/2006 | Blackman et al. |
| 7,131,215 B2 | 11/2006 | Kang |
| D535,900 S | 1/2007 | McKinney |
| 7,159,331 B2 | 1/2007 | Critelli et al. |
| 7,168,182 B2 | 1/2007 | Kilpatrick et al. |
| 7,174,655 B1 | 2/2007 | Gibbons et al. |
| 7,174,656 B1 | 2/2007 | Smith |
| 7,178,257 B2 | 2/2007 | Kang et al. |
| 7,185,446 B1 | 3/2007 | King |
| D540,207 S | 4/2007 | Ikeda |
| 7,234,246 B1 | 6/2007 | Rhead |
| RE39,719 E | 7/2007 | Murray |
| D545,701 S | 7/2007 | Cooper |
| D547,681 S | 7/2007 | Nelson et al. |
| 7,240,439 B2 | 7/2007 | Critelli et al. |
| 7,284,339 B1 | 10/2007 | Campbell et al. |
| 7,299,565 B2 | 11/2007 | Marshall et al. |
| D557,155 S | 12/2007 | Sa'ar |
| D558,620 S | 1/2008 | Critelli et al. |
| D560,522 S | 1/2008 | Farnworth et al. |
| 7,334,344 B2 | 2/2008 | Scarborough |
| 7,343,694 B2 | 3/2008 | Erdfarb |
| D565,441 S | 4/2008 | Critelli |
| D565,442 S | 4/2008 | Critelli |
| 7,353,619 B2 | 4/2008 | Gibbons et al. |
| 7,363,723 B1 | 4/2008 | Peterson |
| 7,377,050 B2 | 5/2008 | Shute et al. |
| 7,398,604 B2 | 7/2008 | Murray |
| 7,406,778 B2 | 8/2008 | Lee et al. |
| 7,415,777 B2 | 8/2008 | Campbell et al. |
| 7,415,778 B1 | 8/2008 | McEwan et al. |
| D579,359 S | 10/2008 | Critelli et al. |
| 7,434,330 B2 | 10/2008 | McEwan et al. |
| 7,454,845 B2 | 11/2008 | Wise |
| D582,810 S | 12/2008 | Cook |
| 7,458,537 B2 | 12/2008 | Critelli et al. |
| 7,475,842 B2 | 1/2009 | Campbell |
| 7,487,600 B1 | 2/2009 | Cooper |
| 7,490,414 B2 | 2/2009 | Critelli et al. |
| 7,490,415 B1 | 2/2009 | Cubbedge |
| D590,283 S | 4/2009 | Critelli et al. |
| D590,284 S | 4/2009 | Critelli et al. |
| 7,555,845 B2 | 7/2009 | Critelli et al. |
| 7,559,154 B2 | 7/2009 | Levine et al. |
| 7,565,751 B2 | 7/2009 | Murray |
| 7,568,296 B2 * | 8/2009 | Huang ............................ 33/761 |
| 7,594,341 B2 | 9/2009 | Erdfarb |
| D603,248 S | 11/2009 | Bar-Erez |
| 7,617,616 B1 | 11/2009 | Berg |
| 7,627,958 B2 | 12/2009 | Tallon et al. |
| 7,631,437 B2 | 12/2009 | Sanderson |
| D611,849 S | 3/2010 | Cook et al. |
| 7,669,347 B1 | 3/2010 | Huang |
| D613,629 S | 4/2010 | Suzuki |
| D614,516 S | 4/2010 | Capra |
| 7,703,216 B2 | 4/2010 | Huang |
| D617,224 S | 6/2010 | Delneo et al. |
| 7,805,855 B2 | 10/2010 | Seo |
| 7,845,093 B2 | 12/2010 | Smiroldo |
| 7,846,673 B2 | 12/2010 | Pastorek et al. |
| 7,854,074 B2 | 12/2010 | Zhou |
| 7,870,679 B2 * | 1/2011 | Lee et al. ....................... 33/770 |
| 7,913,406 B2 | 3/2011 | Norelli |
| 7,918,037 B1 | 4/2011 | Polkhovskiy |
| 7,987,611 B2 | 8/2011 | Taylor |
| 8,015,723 B2 | 9/2011 | Solomon |
| 8,020,311 B2 * | 9/2011 | Lee et al. ....................... 33/770 |
| 8,056,849 B2 | 11/2011 | Ng et al. |
| 8,081,815 B2 | 12/2011 | Kotake |
| D653,974 S | 2/2012 | Capra |

(56) References Cited

U.S. PATENT DOCUMENTS

| | | |
|---|---|---|
| 8,117,762 B2 | 2/2012 | Delneo et al. |
| 8,117,763 B2 | 2/2012 | Delneo et al. |
| D660,735 S | 5/2012 | Petrillo |
| 8,215,027 B2 | 7/2012 | Kang |
| 8,375,595 B2 | 2/2013 | Murray et al. |
| 8,381,411 B2 | 2/2013 | Delarosa et al. |
| 8,407,909 B2 | 4/2013 | Lindsay |
| 2001/0003872 A1 | 6/2001 | Pederson |
| 2001/0042315 A1 | 11/2001 | Dixon |
| 2002/0011008 A1 | 1/2002 | Nelson et al. |
| 2002/0066193 A1 | 6/2002 | Hodge |
| 2002/0066774 A1 | 6/2002 | Prochac |
| 2002/0073570 A1 | 6/2002 | Conder |
| 2003/0009899 A1 | 1/2003 | Ha |
| 2003/0019116 A1 | 1/2003 | DeWall |
| 2003/0019123 A1 | 1/2003 | Lin |
| 2003/0070315 A1 | 4/2003 | Bergeron |
| 2003/0213141 A1 | 11/2003 | Lin |
| 2003/0233762 A1 | 12/2003 | Blackman et al. |
| 2004/0044438 A1 | 3/2004 | Lorraine et al. |
| 2004/0055174 A1 | 3/2004 | Hirsch, Jr. |
| 2004/0071869 A1 | 4/2004 | Gilliam et al. |
| 2004/0088875 A1 | 5/2004 | Lee et al. |
| 2004/0163267 A1 | 8/2004 | Bini |
| 2004/0163271 A1 | 8/2004 | Zars |
| 2004/0163272 A1 | 8/2004 | Knight |
| 2005/0005470 A1 | 1/2005 | Snider |
| 2005/0028396 A1 | 2/2005 | Stauffer et al. |
| 2005/0155244 A1 | 7/2005 | Ryals et al. |
| 2005/0155245 A1 | 7/2005 | Panosian |
| 2005/0252020 A1 | 11/2005 | Critelli et al. |
| 2005/0252021 A1 | 11/2005 | Kang |
| 2006/0010705 A1 | 1/2006 | Dettellis |
| 2006/0096112 A1 | 5/2006 | Berring |
| 2006/0096113 A1 | 5/2006 | Kang et al. |
| 2006/0107546 A1 | 5/2006 | Pritchard |
| 2006/0130352 A1 | 6/2006 | Huang |
| 2006/0185185 A1 | 8/2006 | Scarborough |
| 2006/0230627 A1 | 10/2006 | Blackman et al. |
| 2006/0248742 A1 | 11/2006 | Marshall et al. |
| 2006/0283036 A1 | 12/2006 | Huang |
| 2007/0017111 A1 | 1/2007 | Hoback et al. |
| 2007/0056182 A1 | 3/2007 | Di Bitonto et al. |
| 2007/0079520 A1 | 4/2007 | Levine et al. |
| 2007/0152091 A1 | 7/2007 | Campbell |
| 2007/0171630 A1 | 7/2007 | Gibbons et al. |
| 2007/0227028 A1 | 10/2007 | Campbell et al. |
| 2008/0028628 A1 | 2/2008 | Campbell et al. |
| 2008/0086902 A1 | 4/2008 | Murray |
| 2008/0086903 A1 | 4/2008 | Peterson |
| 2008/0086904 A1 | 4/2008 | Murray |
| 2008/0285854 A1 | 11/2008 | Kotake et al. |
| 2009/0064517 A1 | 3/2009 | Sanderson |
| 2009/0064525 A1 | 3/2009 | Chen |
| 2009/0064526 A1 | 3/2009 | Farnworth et al. |
| 2009/0249636 A1 | 10/2009 | Reda et al. |
| 2010/0139110 A1 | 6/2010 | Germain |
| 2010/0314277 A1 | 12/2010 | Murray |
| 2010/0325910 A1 | 12/2010 | Huang |
| 2011/0005094 A1 | 1/2011 | Solomon |
| 2011/0138642 A1 | 6/2011 | Norelli |
| 2011/0179661 A1 | 7/2011 | Delneo et al. |
| 2011/0179663 A1 | 7/2011 | Kang |
| 2011/0179664 A1 | 7/2011 | Delneo et al. |
| 2012/0036727 A1 | 2/2012 | McCarthy |
| 2012/0055038 A1 | 3/2012 | Lindsay |
| 2012/0073156 A1 | 3/2012 | DeLaRosa et al. |
| 2012/0159799 A1 | 6/2012 | Murray et al. |
| 2012/0167403 A1 | 7/2012 | Roeske |
| 2013/0025147 A1* | 1/2013 | Steele et al. .................... 33/769 |
| 2013/0025148 A1 | 1/2013 | Steele et al. |
| 2013/0047455 A1* | 2/2013 | Steele et al. .................... 33/761 |
| 2013/0185949 A1 | 7/2013 | Burch et al. |

FOREIGN PATENT DOCUMENTS

| | | |
|---|---|---|
| DE | 102006058396 B4 | 6/2011 |
| EP | 66322 | 10/1986 |
| EP | 0199430 | 10/1986 |
| EP | 531570 | 3/1993 |
| EP | 427932 | 2/1996 |
| EP | 0724133 | 7/1996 |
| EP | 0896200 A2 | 2/1999 |
| EP | 0896200 A3 | 12/1999 |
| EP | 1074813 | 2/2001 |
| EP | 1175840 | 1/2002 |
| EP | 1411319 | 4/2004 |
| EP | 1144947 | 9/2004 |
| EP | 1469276 | 10/2004 |
| EP | 1104542 | 12/2004 |
| EP | 1553382 | 7/2005 |
| EP | 0922196 | 11/2005 |
| EP | 1647797 | 4/2006 |
| EP | 1237431 | 10/2006 |
| EP | 1914508 | 4/2008 |
| EP | 1914509 | 4/2008 |
| EP | 2469218 | 6/2012 |
| GB | 690458 | 4/1953 |
| JP | 1961002384 | 2/1961 |
| JP | 1983134704 | 9/1983 |
| JP | 10332301 | 12/1998 |
| KR | 19840001901 | 9/1984 |
| KR | 19910004712 | 11/1991 |
| WO | WO 9402799 | 2/1994 |
| WO | WO 9714541 | 4/1997 |
| WO | WO 98/09133 | 3/1998 |
| WO | WO 9811402 | 3/1998 |
| WO | WO 98/23524 | 6/1998 |
| WO | WO 99/23447 | 5/1999 |
| WO | WO 00/09969 | 2/2000 |
| WO | WO 0060306 | 10/2000 |
| WO | WO 02057710 | 7/2002 |
| WO | WO 03/031903 | 4/2003 |
| WO | WO 2005/008171 | 1/2005 |
| WO | WO 2007/059353 | 5/2007 |
| WO | WO 2007/059354 | 5/2007 |
| WO | WO 2007/126960 | 11/2007 |

* cited by examiner

TAPE MEASURE

CROSS-REFERENCE TO RELATED APPLICATIONS

This application claims priority to U.S. Provisional Patent Application No. 61/513,280, filed on Jul. 29, 2011, U.S. Provisional Patent Application No. 61/607,060, filed on Mar. 6, 2012, and U.S. Provisional Patent Application No. 61/656,297, filed on Jun. 6, 2012, the entire contents of which are incorporated by reference herein.

BACKGROUND

The present invention relates to measurement devices. More specifically, the invention relates to a tape measure including a housing having a plurality of apertures.

SUMMARY

In one embodiment, the invention provides a tape measure. The tape measure includes a housing assembly having a first side wall, a second side wall, and a peripheral wall extending from the first side wall to the second side wall. A cavity is defined within the housing assembly, and the first side wall defines at least one aperture open to the cavity during use of the tape measure. The peripheral wall defines a tape port. A spool is rotatably supported in the cavity about an axis. The spool includes at least a portion of a measuring tape. A hook member is fixedly coupled to an end portion of the measuring tape. The spool includes a retraction mechanism with an elongated coiled spring.

In another embodiment, the invention provides a tape measure. The tape measure includes a first side wall and a second side wall. The first side wall defines a first plurality of apertures and a second plurality of apertures. A peripheral wall is coupled to and cooperates with the first side wall and the second side wall to define a cavity. A retraction mechanism disposed within the cavity and supported for rotation about an axis. A measuring tape is coupled to the retraction mechanism and includes an end portion disposed outside of the cavity. A hook member is coupled to the end portion. At least a portion of the tape is wound into a spool and is disposed within the cavity. The first plurality of apertures is disposed on a first half of the first side wall and the second plurality of apertures is disposed on a second half of the first side wall. Each aperture of the first plurality of apertures and the second plurality of apertures is open to the cavity during use of the tape measure.

Other aspects of the invention will become apparent by consideration of the detailed description and accompanying drawings.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

Figure 1:
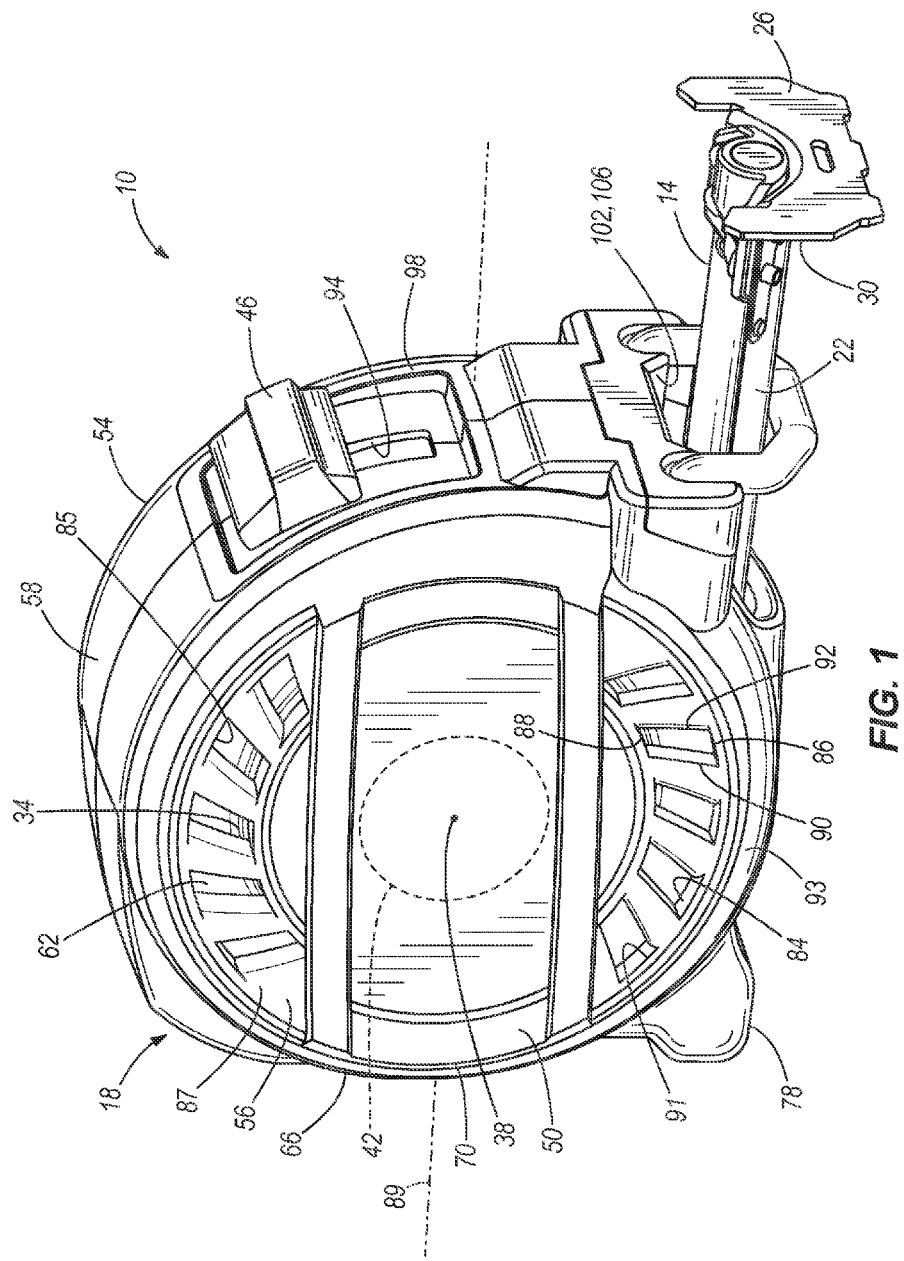
FIG. 1 is a perspective view of a tape measure according to one construction of the invention.
Figure 2:
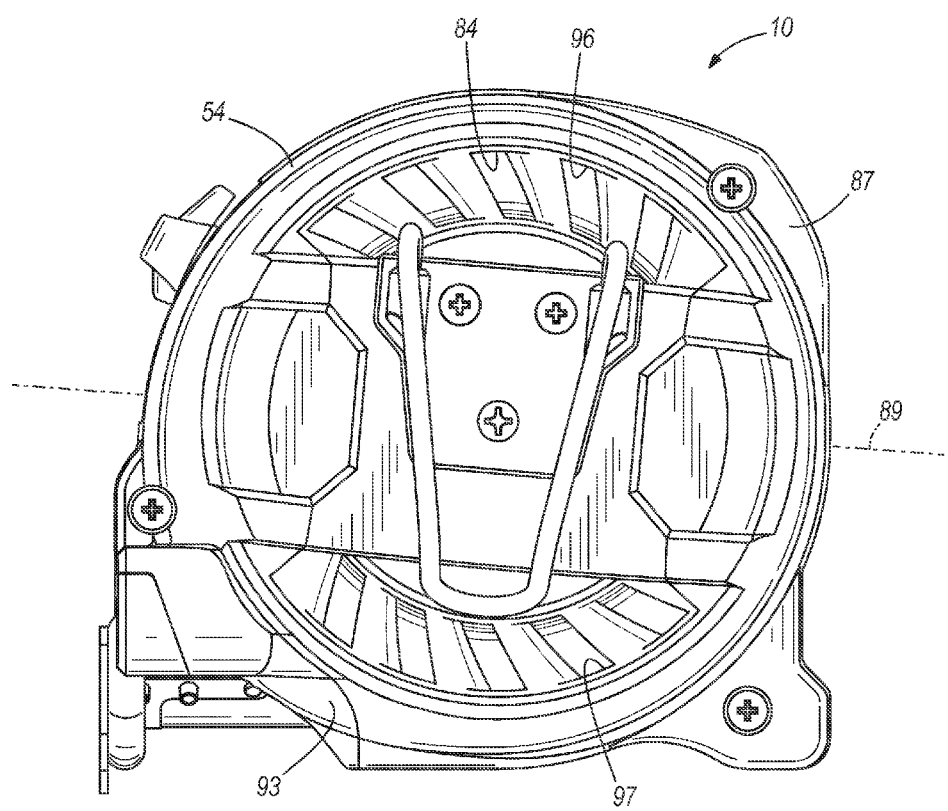
FIG. 2 is a rear view of the tape measure of FIG. 1.

FIGS. 1 and 2 illustrate a length measurement device, more specifically, a tape measure 10. The tape measure 10 includes a coilable measuring tape 14 and a housing assembly 18.

As illustrated in FIG. 1, a variable-length extended segment 22 of the measuring tape 14 is retractable and extendable from the housing assembly 18. A hook member 26 is fixedly coupled to an end portion 30 of the measuring tape 14. The remainder of the measuring tape 14 forms a spool 34 rotatably disposed about an axis 38 of the tape measure 10. A retraction mechanism 42 is coupled to the spool 34 to provide for powered retraction of the measuring tape 14. The retraction mechanism 42 may include an elongated coiled spring for motive force. A tape lock 46 is provided to selectively engage at least one of the spool 34 and the spring retraction mechanism 42, such that the extended segment 22 of the measuring tape 14 remains at a desired length.

Referring to FIG. 1, the housing assembly 18 includes a first side wall 50, a second side wall 54, and a peripheral wall 58 connecting the first side wall 50 and the second side wall 54. The first side wall 50 defines an outer radial portion 56 and an inner radial portion 57, preferably an outer radial half and an inner radial half, of the housing assembly 18. The first side wall 50, second side wall 54, and peripheral wall 58 define an internal cavity 62 in which the spool 34 and retraction mechanism 42 are housed. In the illustrated construction, each of the first side wall 50 and the second side wall 54 has a substantially circular profile 66. In other embodiments, the side walls may be rectangular, polygonal, or any other desired shape. Portions of the housing assembly 18 may be co-molded or separately formed of a resilient material, such as a natural or synthetic rubber. In the illustrated construction, the housing assembly 18 is formed with housing bumpers 70 and a rear support leg 78 that extends from a lower portion 82 of the peripheral wall 58.

With reference to FIG. 1 the first side wall 50 includes a plurality of apertures 84 arranged circumferentially about the axis 38 and equidistant from one another. The apertures are arranged within the outer radial portion 56. The apertures 84 pass through the first side wall 50 and provide access to the internal cavity 62. By providing access to the internal cavity 62, the apertures 84 allow a user to, for example, clean the spool 34 and retraction mechanism 42 with compressed air. The apertures 84 are open to the cavity 62 during use of the tape measure 10. Referring to FIG. 2, in some constructions, the second side wall 54 may also have apertures 84 similar to the apertures 84 of the first side wall 50.

Referring to FIG. 1, the first plurality of apertures 85 is defined in the first side wall 50 on a first half 87 of a centerline 89, and a second plurality of apertures 91 is defined in the first side wall 50 on a second half 93 of the centerline 89. As illustrated in FIG. 2, in some constructions, a third plurality of apertures 96 is defined in the second side wall 54 on the first half 87 of the centerline 89, and a fourth plurality of apertures 97 is defined in the second side wall 54 on the second half 93 of the centerline 89.

With continued reference to FIG. 1, each of the plurality of apertures 84 includes a first edge 86 and a second edge 88 such that the first edge 86 is parallel to the second edge 88. The first edge 86 and the second edge 88 are non-radial with respect to the axis 38. A third edge 90 and a fourth edge 92 extend between the first edge 86 and the second edge 88 such that the third edge 90 is parallel to the fourth edge 92.

A slot 94 is defined along a forward portion 98 of the peripheral wall 58. The slot 94 is provided to allow for sliding movement of the tape lock 46 relative to the housing assembly 18.

Below the slot 94, a tape port 102 is provided in the peripheral wall 58. The tape port 102 has an arcuate shape 106, corresponding to an arcuate cross-sectional profile of the measuring tape 14. The tape port 102 allows for the retraction and extension of the measuring tape 14 to and from the internal cavity 62.

Thus, the invention provides, among other things, a tape measure including a housing having a plurality of apertures. Although the invention has been described in detail with reference to certain preferred embodiments, variations and modifications exist within the scope and spirit of one or more independent aspects of the invention as described.

We claim:

1. A tape measure comprising:
    a housing assembly that at least partially defines an outermost portion of the tape measure, the housing assembly including a first side wall, a second side wall, and a peripheral wall extending from the first side wall to the second side wall, the housing assembly defining a cavity, the first side wall defining a first aperture open to the cavity during use of the tape measure, and the peripheral wall defining a tape port;
    a spool rotatably supported in the cavity about an axis;
    a measuring tape, wherein at least a portion a of the measuring tape forms the spool;
    a hook member fixedly coupled to an end portion of the measuring tape;
    a retraction mechanism coupled to the spool and disposed within the housing, the retraction mechanism including an elongated coiled spring, wherein the first aperture includes a first edge, a second edge, a third edge, and a fourth edge.

2. The tape measure according to claim 1, wherein the first aperture is one of a plurality of apertures that are spaced equidistant from one another.

3. The tape measure according to claim 2, wherein the first side wall and the second side wall are of a substantially circular shape.

4. The tape measure according to claim 2, wherein the plurality of apertures are arranged circumferentially about the axis.

5. The tape measure according to claim 2, wherein the first side wall includes an outermost edge, and wherein the plurality of apertures are arranged adjacent the outermost edge such that the plurality of apertures are closer to the outer edge than to the axis.

6. The tape measure according to claim 1, wherein the first edge is parallel to the second edge, and the first edge and the second edge are non-radial with respect to the axis.

7. The tape measure according to claim 6, wherein the first aperture is substantially a parallelogram.

8. The tape measure according to claim 1, wherein the first side wall includes an outer radial portion and an inner radial portion, and wherein the first aperture is disposed within the outer radial portion.

9. The tape measure according to claim 1, wherein the second side wall includes a second aperture providing access to the cavity.

10. A tape measure comprising:
    an outer housing assembly including a first side wall, a second side wall, and a peripheral wall extending from the first side wall to the second side wall, the outer housing assembly defining a cavity, the first side wall defining a first plurality of apertures defined on a first side of a centerline and a second plurality of apertures defined on a second side of the centerline, each of the plurality of apertures open to the cavity during use of the tape measure;
    a spool rotatably supported in the cavity about an axis;
    a measuring tape, wherein at least a portion a of the measuring tape forms the spool;
    a hook member fixedly coupled to an end portion of the measuring tape;
    a retraction mechanism coupled to the spool, the retraction mechanism including an elongated coiled spring, wherein the second plurality of apertures are a mirror image of the first plurality of apertures.

11. The tape measure according to claim 10, wherein the first plurality of apertures are equidistance from one another.

12. The tape measure according to claim 11, wherein each of the plurality of apertures are arranged circumferentially about the axis.

13. A tape measure comprising:
    an outer housing assembly including a first side wall, a second side wall, and a peripheral wall extending from the first side wall to the second side wall, the outer housing assembly defining a cavity, the first side wall defining a first plurality of apertures defined on a first side of a centerline and a second plurality of apertures defined on a second side of the centerline, each of the plurality of apertures open to the cavity during use of the tape measure;
    a spool rotatably supported in the cavity about an axis;
    a measuring tape, wherein at least a portion a of the measuring tape forms the spool;
    a hook member fixedly coupled to an end portion of the measuring tape;
    a retraction mechanism coupled to the spool, the retraction mechanism including an elongated coiled spring, wherein the second side wall defines a third plurality of apertures on the first side of the centerline and a fourth plurality of apertures on the second side of the centerline.

14. The tape measure according to claim 10, wherein the first side wall includes an outermost edge, an outer radial portion and an inner radial portion, and wherein the first plurality of apertures and the second plurality of apertures are disposed within the outer radial portion adjacent the outermost edge.

15. A tape measure comprising:
    a retraction mechanism positioned around a rotational axis;
    a measuring tape having a first end and a second end opposite the first end, the second end coupled to the retraction mechanism, the retraction mechanism operable to bias the measuring tape into a coiled position around the axis and outside of the retraction mechanism;
    a first side wall at least partially defining an exterior surface of the tape measure, the first side wall positioned normal to the rotational axis and defining an outer portion arranged adjacent the measuring tape and an inner portion arranged adjacent the retraction mechanism when the measuring tape is in the coiled position; and
    a first cleaning aperture formed in the outer portion of the first side wall, the first cleaning aperture providing communication between an outside of the first side wall and the measuring tape to facilitate cleaning of the measuring tape while the tape is in the coiled position.

16. The tape measure of claim 15, wherein the first cleaning aperture is one of a plurality of cleaning apertures, the plurality of cleaning apertures arranged such that the apertures in a first half of the first side wall are a substantial mirror image of the apertures in a second half of the first side wall about a first plane that passes through the axis.

17. The tape measure of claim 16, further comprising a second side wall spaced apart from the first side wall such that the retraction mechanism and the measuring tape are disposed between the first side wall and the second side wall, the second side wall being a substantial mirror image of the first side wall.

18. The tape measure of claim 15, wherein the first cleaning aperture is one of a plurality of cleaning apertures, and wherein the plurality of apertures are arranged such that the apertures are symmetric about a first plane that passes through the axis and a second plane that is normal to the first plane and passes through the axis.

* * * * *